July 25, 1967 A. E. CRUMP 3,333,161

INHIBITING GATE WITH OUTPUT RELAY MEANS

Filed Nov. 17, 1964

INVENTOR
ARTHUR EDGAR CRUMP
BY
Kurtz, Kurtz & Ollinger
ATTORNEYS

United States Patent Office 3,333,161
Patented July 25, 1967

3,333,161
INHIBITING GATE WITH OUTPUT RELAY MEANS

Arthur Edgar Crump, Haywards Heath, Sussex, England, assignor to The General Electric Company Limited, London, England Filed Nov. 17, 1964, Ser. No. 411,746
Claims priority, application Great Britain, Nov. 27, 1963, 46,866/63
2 Claims. (Cl. 317—148.5)

ABSTRACT OF THE DISCLOSURE

An electric gating circuit that is responsive to two-level voltage signals applied to input and inhibit terminals thereof in which resistance-capacitance networks delay the response of the circuit to changes in the input signals in a manner such that the inhibit input responds more quickly on "switch on" and more slowly on "switch off" than the normal input, whereby spurious responses to simultaneous "switch on" or "switch off" of the two signals are avoided.

Figure 1:
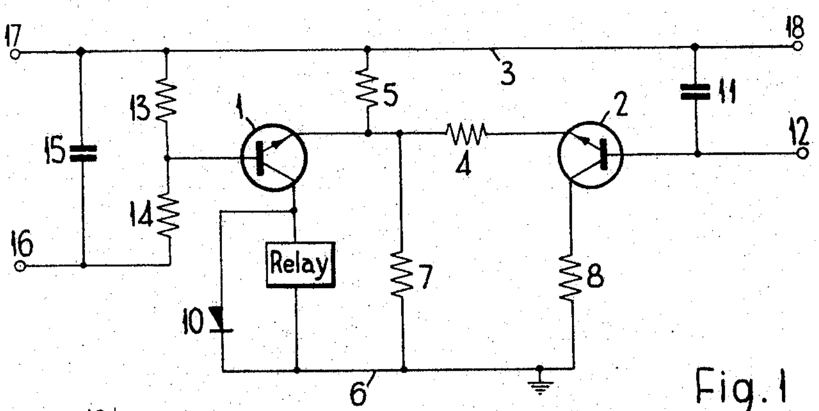

This invention relates to electric gating circuits.

More particularly this invention relates to electric gating circuits of the type which supply an output signal in dependence upon the potentials of a two-level main input signal and a two-level inhibitory input signal, an output signal being supplied only when the main input signal and the inhibitory input signal have a predetermined relationship.

With a gating circuit of the type described above there is a chance that, when the main input signal and the inhibitory input signal are simultaneously changing their levels, the circuit may pass through a condition in which an output signal is wrongly supplied by it.

An object of the present invention is to provide an electric gating circuit in which the chance of wrong operation under the conditions described above is greatly reduced.

According to the present invention an electric gating circuit which supplies an output signal in dependence upon the potentials of a two-level main input signal and a two-level inhibitory input signal, the output signal being supplied only when the main input signal and the inhibitory input signal have a predetermined relationship, comprises a first pair of input terminals to which, during use of the circuit, the two-level main input signal is supplied, a second pair of input terminals to which, during use of the circuit, the two-level inhibitory input signal is supplied, a transistor having three electrodes, a first electric network connecting the first pair of input terminals to a first electrode of the transistor, a second electric network connecting the second pair of input terminals to a second electrode of the transistor, and means connected to the third electrode of the transistor to derive the output signal therefrom, said first electric network operating to supply to said first electrode of said transistor a first electric signal having a potential within a first range of potentials, the potential of said first electric signal changing between the limits of said first range of potentials in response to said main input signal changing between its said two levels, and said second electric network operating to supply to said second electrode of said transistor a second electric signal having a potential within a second range of potentials, the potential of said second electric signal changing between the limits of said second range of potentials in response to said inhibitory input signal changing between its said two levels, the limits of said first range of potentials being different from the limits of said second range of potentials, and said first and second ranges of potential being partially overlapping, the arrangement being such that when said main and inhibitory input signals change between their said two levels simultaneously such that said circuit is not supplying an output signal immediately before and after said change, said circuit does not supply an output signal during said change.

Said two levels of said main input signal may be the same as said two levels of said inhibitory input signal.

Said transistor may be a junction transistor having an emitter, a base, and a collector electrode, said first electrode being the base electrode, said second electrode being the emitter electrode, and said third electrode being the collector electrode.

Said first and second electric networks may be resistance-capacitance networks.

Said second electric network may comprise a further transistor having three electrodes, a capacitive element connected between a first and a second electrode of said further transistor, said second pair of input terminals being connected one to each terminal of said capacitive element, and means to supply bias potentials to the second and the third electrodes of said further transistor, the second electrode of said further transistor being connected to the second electrode of the first mentioned transistor, the arrangement being such that said second electric network exhibits a high input impedance and a low output impedance.

Said output signal may be supplied to the operating winding of an electromagnetic relay in order to control the condition of said relay.

Figure 2:
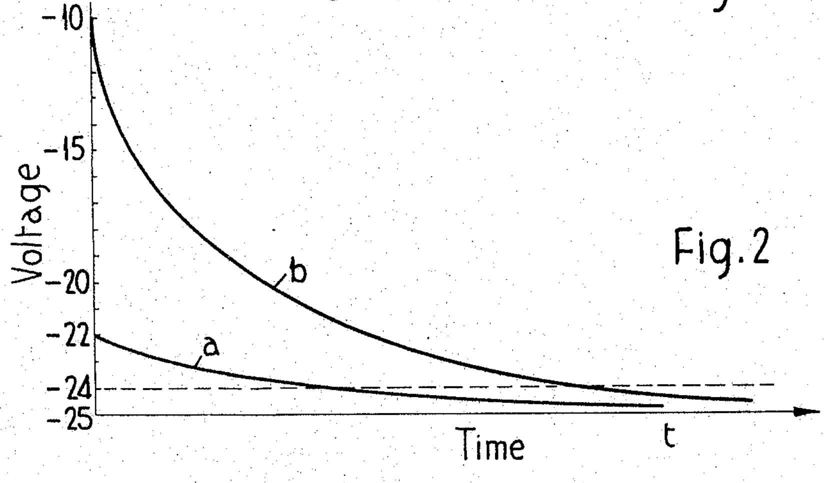
Figure 3:
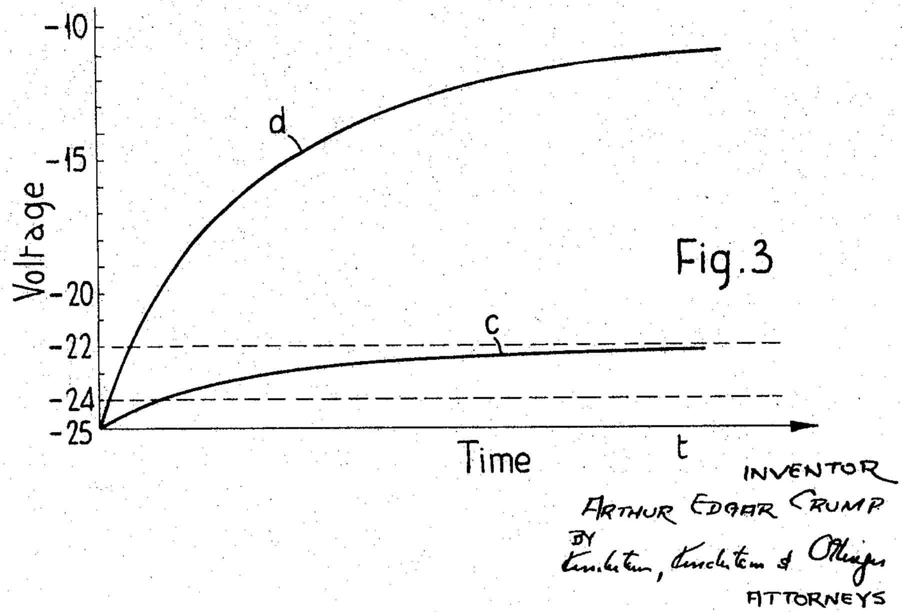

One embodiment of a gating circuit in accordance with the present invention will now be described by way of example, with reference to the accompanying drawing in which, FIGURE 1 is a circuit diagram of the gating circuit, FIGURE 2 is a graph showing the variation of the potentials at the base electrodes of the transistors shown in FIGURE 1 when the input signal voltages simultaneously fall in value, and FIGURE 3 is a graph showing the variation of the potentials at the base electrodes of the transistors shown in FIGURE 1 when the input signal voltages simultaneously rise in value.

Referring now to FIGURE 1, the arrangement includes two n-p-n junction transistors 1 and 2. The emitter electrode of the transistor 2 is connected to a supply line 3 by way of two resistors 4 and 5. The emitter electrode of the transistor 1 is connected to the junction of the resistors 4 and 5, which junction is also connected to an earth line 6 by way of a resistor 7. The collector electrode of the transistor 2 is connected to the earth line 6 by way of a resistor 8. The collector electrode of the transistor 1 is connected to the earth line 6 by way of the operating winding of a relay 9, and by way of a diode 10. The base electrode of the transistor 2 is connected to the supply line 3 by way of a variable capacitor 11, and directly to an input terminal 12. The base electrode of the transistor 1 is connected to the supply line 3 by way of a resistor 13 and by way of a resistor 14 and a variable capacitor 15 connected in series, and to an input terminal 16 by way of the resistor 14.

During use of the arrangement the supply line 3 is maintained at a suitable negative potential with respect to earth, and a main input signal is supplied between the terminals 16 and 17 with the negative side of the signal tied to the terminal 17.

An inhibitory input signal is supplied between the terminals 12 and 18 with the negative side of the signal tied to the terminal 18.

In one example of the embodment described above, the supply line 3 is maintained at a potential of —25 volts. The main input signal and the inhibitory input signal are both signals having selectively one or other of two values so that the terminals 12 and 16 may each be at a potential of either —25 volts or —10 volts. It will be appreciated that for each of the terminals 12 and 16, the transition between the conditions of being at a potential of —25 volts and being at a potential of —10 volts will take a finite time. The values of the resistors 5 and 7 are 180 ohms and 4300 ohms respectively and thus the potential at the junction between them is —24 volts when the terminals 12 and 16 are both at a potential of —25 volts. The values of the resistors 13 and 14 are 3000 ohms and 12000 ohms respectively and thus the potential at the junction between them is —22 volts when the potential at the teminal 16 is —10 volts. The values of the capacitors 11 and 15 are set such that the potentials at the base electrodes of the transistors 1 and 2 will simultaneously reduce to a potential of —25 volts when the potentials at the terminals 12 and 16 simultaneously reduce from —10 volts to —25 volts and are 0.6$\mu$f. and 0.9 $\mu$f. respectively. The value of the resistor 8 is 200 ohms and is such as to safely limit the dissipation of the transistor 2. The value of the resistor 4 is 390 ohms. The transistors 1 and 2 are both type OC 140 as sold by Mullard Ltd.

Referring now to FIGURE 2, this indicates the rates of reduction in potential at the base electrodes of the transistors 1 and 2 when the potentials at the terminals 12 and 16 simultaneously reduce from —10 volts to —25 volts. The curve *a* refers to the transistor 1 and indicates a drop in potential from —22 volts to —25 volts in a finite time *t*, while the curve *b* refers to the transistor 2 and indicates a drop in potential from —10 volts to —25 volts in the same finite time *t*.

Referring now to FIGURE 3, this indicates the rate of increase in potential at the base electrodes of the transistors 1 and 2 when the potentials at the terminals 12 and 16 simultaneously rise from —25 volts to —10 volts. The curve *c* refers to the transistor 1 and indicates an increase in potential from —25 volts to —22 volts in finite time *t*, while the curve *d* refers to the transistor 2 and indicates an increase in potential from —25 volts to —10 volts in the same finite time *t*.

In operation of the embodiment described above the relay 9 is operated only when current is supplied to it by the transistor 1, that is when the transistor 1 is biassed "on."

When the terminals 12 and 16 are both at a potential of —25 volts and the supply line 3 is also at a potential of —25 volts the transistors 1 and 2 are both biassed "off," the resistors 5 and 7 holding the emitter electrodes of the transistors 1 and 2 at a potential of —24 volts, and the relay 9 is held released.

To operate the relay 9, the terminal 16 is raised to a potential of —10 volts while the terminal 12 is maintained at a potential of —25 volts. In this condition the resistors 13 and 14 hold the base electrode of the transistor 1 at a potential of —22 volts while the base electrode of the transistor 2 is at a potential of —25 volts. The transistor 2 is thus biassed "off" while the transistor 1 is biassed "on" and current is supplied to the relay 9 causing it to operate.

If the terminal 12 is at a potential of —10 volts and the terminal 16 is at a potential of —25 volts, the transistor 2 is biassed "on" and its emitter current ensures that the emitter electrode of the transistor 1 is at such a potential that the transisor 1 is biassed "off," and no current is supplied to the relay 9 and it is in the released condition.

If the terminals 12 and 16 are both at a potential of —10 volts, the base electrode of the transistor 2 will be at a potential of —10 volts and the base electrode of the transistor 1 will be at a potential of —22 volts. In this condition the transistor 2 is biassed "on" and its emitter current is such as to raise the potential at the junction of the resistors 5 and 7, and thus at the emitter electrode of the transistor 1, to a value which exceeds the potential at the base electrode of the transistor 1 thus holding the transistor 1 biassed "off" so that no current is supplied to the relay 9 and it is in the released condition.

If the terminals 12 and 16 simultaneously fall in potential from —10 volts to —25 volts, the base electrodes of the transistors 1 and 2 will simultaneously fall to a potential of —25 volts from potentials of —22 volts and —10 volts respectively, the time taken for the base electrodes to reach a potential of —25 volts having been made the same for both the transistors 1 and 2 by the previous setting of the capacitors 11 and 15 to the required values. Under these conditions the transistor 2 is initially biassed "on" the transistor 1 is biassed "off," and the relay 9 is in the released condition. As can be seen from FIGURE 2, the potential at the base electrode of the transistor 1 reduces to the level below which the transistor 1 would be biassed "off" even without the inhibiting action of the transistor 2 before the base electrode of the transistor 2 reaches the level at which it becomes biassed "off," and thus the transistor 17 remains in the biassed "off" condition during the finite time taken for the terminals 12 and 16 to reduce to a potential of —25 volts from a potential of —10 volts, and the relay is in the released condition throughout the change, and thereafter.

If the terminals 12 and 16 simultaneously rise in potential from a potential of —25 volts to a potential of —10 volts, the base electrodes of the transistors 1 and 2 will simultaneously rise in potential from a potential of —25 volts to potentials of —22 volts and —10 volts respectively, the time taken for the base electrodes to reach these potentials being the same for both of the transistors 1 and 2. Under these conditions the transistors 1 and 2 are both initially biassed "off" and the relay 9 is in the released condition. As can be seen from FIGURE 3 the potential at the base electrode of the transistor 2 reaches the level at which the transistor 2 becomes biassed "on" before the base electrode of the transistor 1 reaches the potential at which the transistor 1 would be biassed "on" but for the inhibiting action of the transistor 2, and thus the transistor 1 remains in the biassed "off" condition during the finite time taken for the terminals 12 and 16 to rise from a potential of —25 volts to a potential of —10 volts, and the relay 9 is in the released condition throughout the change, and thereafter.

The diode 10 is included in the circuit to protect the transistor 1 from the induced voltage surges which occur when the relay 9 returns from the operated to the released condition.

One application of the gating circuit described above is in the transmitting equipment of a multi-channel frequency division multiplex telephony system. In such a system there is provided a pair of standard frequency pilot signal generators, one used during normal operation of the equipment and the other one acting as a spare in case of failure of the normally used one.

The relay 9 in the gating circuit operates to control which one of the pair of generators is being utilised at any time, the normal one being utilised when the relay 9 is relased, and the spare one being utilised when the relay 9 is operated.

The main and inhibitory input signals supplied to the gating circuit are dependent upon the amplitudes of the pilot signals supplied by the pair of generators the main input signal being supplied only if the normally used generator should fail, and the inhibitory input signal being supplied only if the spare generator should fail.

During normal operation of the equipment the normally used generator is being utilised, no main input signal is supplied to the gating circuit, and the relay 9 is released.

If the normally used generator should fail the equipment operates to supply the main input signal to the gating circuit and thus the relay 9 is operated and serves to switch in the spare generator in place of the normally used one.

If, however, the spare generator has previously failed the inhibitory input signal is being supplied to the gating circuit, and even though the main input signal is supplied to the gating circuit the relay 9 remains released and the failed spare generator is not switched in in place of the failed normally used one.

Thus the switching in of a failed generator in place of another failed generator is avoided and an immediate indication of failure is given.

I claim:

1. An electric gating circuit which supplies an output signal in dependence upon the potential of a two-level main input signal when a two-level inhibitory input signal applied thereto is of a first voltage level, and substantially no output signal when said inhibitory input signal is of a second voltage level, said circuit comprising a pair of main input terminals, a pair of inhibitory input terminals, first and second junction transistors each having emitter, base and collector electrodes, a resistor, means connecting the emitter electrodes of the two transistors together and by way of said resistor to a point of reference potential, potential divider means, means connecting said potential divider means between said pair of main input terminals, means connecting one of said pair of main input terminals to said point of reference potential, means connecting a tapping on said potential divider to the base electrode of said first transistor, means connecting the pair of inhibitory input terminals respectively to said point of reference potential and the base electrode of said second transistor, first and second capacitive means connected respectively between said main input terminals and between said inhibitory input terminals, and output means connected in the collector circuit of said first transistor, the arrangement being such that the potentials at the base electrodes of the transistors change, in response to changes in level in the respective input signals, between different pairs of limits but take substantially the same length of time to complete the change between respective limits, whereby when the main and inhibitory signals simultaneously change in the same sense the circuit does not supply an output signal during the change.

2. An electric gating circuit in accordance with claim 1 wherein said output means comprises an electromagnetic relay an operating winding of which is connected in the collector circuit of said first transistor.

References Cited

UNITED STATES PATENTS

| | | | |
|---|---|---|---|
| 2,908,828 | 10/1959 | Thompson | 307—88.5 |
| 3,106,646 | 10/1963 | Carter | 307—88.5 |
| 3,139,562 | 6/1964 | Freeborn | 317—148.5 |

FOREIGN PATENTS

| | | |
|---|---|---|
| 2,225,510 | 9/1958 | Australia. |

OTHER REFERENCES

IBM Technical Disclosure Bulletin, vol. 1, No. 2, August 1958.

MILTON O. HIRSHFIELD, *Primary Examiner.*

J. A. SILVERMAN, *Assistant Examiner.*